United States Patent
Jonak et al.

(10) Patent No.: US 11,803,658 B1
(45) Date of Patent: Oct. 31, 2023

(54) DATA ACCESS CONTROL

(71) Applicant: UIPCO, LLC, San Antonio, TX (US)

(72) Inventors: Sumita T. Jonak, San Antonio, TX (US); Pooja Krishnaswamy, Cedar Park, TX (US); Christopher Russell, San Antonio, TX (US); Gabriel Carlos Fernandez, San Antonio, TX (US); Joel S. Hartshorn, Olalla, WA (US); Thomas Wayne Schwarz, Jr., Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 139 days.

(21) Appl. No.: 17/083,891

(22) Filed: Oct. 29, 2020

Related U.S. Application Data

(60) Provisional application No. 62/927,464, filed on Oct. 29, 2019.

(51) Int. Cl.
*G06F 21/62* (2013.01)
*H04L 9/40* (2022.01)

(52) U.S. Cl.
CPC ........ *G06F 21/6245* (2013.01); *H04L 63/101* (2013.01)

(58) Field of Classification Search
CPC .......................... G06F 21/6245; H04L 63/101
See application file for complete search history.

(56) References Cited

U.S. PATENT DOCUMENTS

| | | | | |
|---|---|---|---|---|
| 7,954,150 | B2* | 5/2011 | Croft | H04L 67/08 726/21 |
| 8,677,132 | B1* | 3/2014 | Liao | H04L 9/321 713/176 |
| 9,563,763 | B1* | 2/2017 | Roth | G06F 21/36 |
| 10,075,451 | B1* | 9/2018 | Hall | H04W 4/23 |
| 10,346,637 | B2* | 7/2019 | Barday | G06F 3/0608 |
| 10,936,760 | B1* | 3/2021 | Hadsall | G06V 40/1365 |
| 2013/0160079 | A1* | 6/2013 | Hebert | H04L 63/145 726/3 |
| 2015/0249709 | A1* | 9/2015 | Teng | H04L 67/06 707/785 |
| 2017/0063682 | A1* | 3/2017 | Lentczner | H04L 61/2592 |
| 2018/0052981 | A1* | 2/2018 | Nygate | G06N 7/005 |
| 2020/0327254 | A1* | 10/2020 | Abilash | H04L 9/3218 |
| 2020/0402056 | A1* | 12/2020 | Balagopal | G06Q 20/322 |
| 2021/0089657 | A1* | 3/2021 | Dunjic | G06F 21/60 |

\* cited by examiner

*Primary Examiner* — Carl G Colin
*Assistant Examiner* — Andrew Suh
(74) *Attorney, Agent, or Firm* — Perkins Coie LLP

(57) ABSTRACT

A corporate information technology (IT) network can protect sensitive data sent to computers located outside of the IT network. For example, a customer of a company may control who can access his or her sensitive personal information by identifying his or her access preference included in an access control list, where the access preference describes a level of access that at least one remote employee or person may have to the customer's sensitive personal information. A data protection server may containerize the sensitive personal information and the access control list of the person in a data protection container. If a remote employee or a person requests access the customer's sensitive personal information, the data protection server may perform data protection related operations to provide the sensitive personal information to the remote employee or person.

20 Claims, 4 Drawing Sheets

DATA ACCESS CONTROL

CROSS-REFERENCE TO RELATED APPLICATION(S)

This application is a non-provisional of and claims priority to U.S. Provisional Application No. 62/927,464, filed on Oct. 29, 2019, entitled "DATA ACCESS CONTROL," which is hereby incorporated by reference in its entirety for all purposes.

TECHNICAL FIELD

This disclosure is directed generally to systems, methods, and apparatuses for providing data security.

BACKGROUND

Many companies and organizations have set up their corporate information technology (IT) networks so that their employees can work from any place that has Internet access. To remotely access a corporate IT network, an employee may be required to log into a computer using credentials, such as a username and password. Today, employees regularly log into and access their corporate networks from home, coffee shops, or airports. For example, a consultant who regularly travels may use his or her laptop to access certain documents or send and receive emails at an airport or hotel. In another example, a software engineer can avoid rush-hour traffic in the morning by writing or reviewing software code from home or coffee shop until after the traffic subsides. Technology has made it possible for employees to have the flexibility to work from any place that has Internet access including their corporate offices. However, companies and organizations that offer remote access capabilities to their employees also face certain security risks. For example, an unauthorized person may hack into the corporate server that provides sensitive customer data to computers remotely operated by employees. In another example, an employee may himself or herself remotely log into the corporate network for such nefarious purposes.

Figure 1:
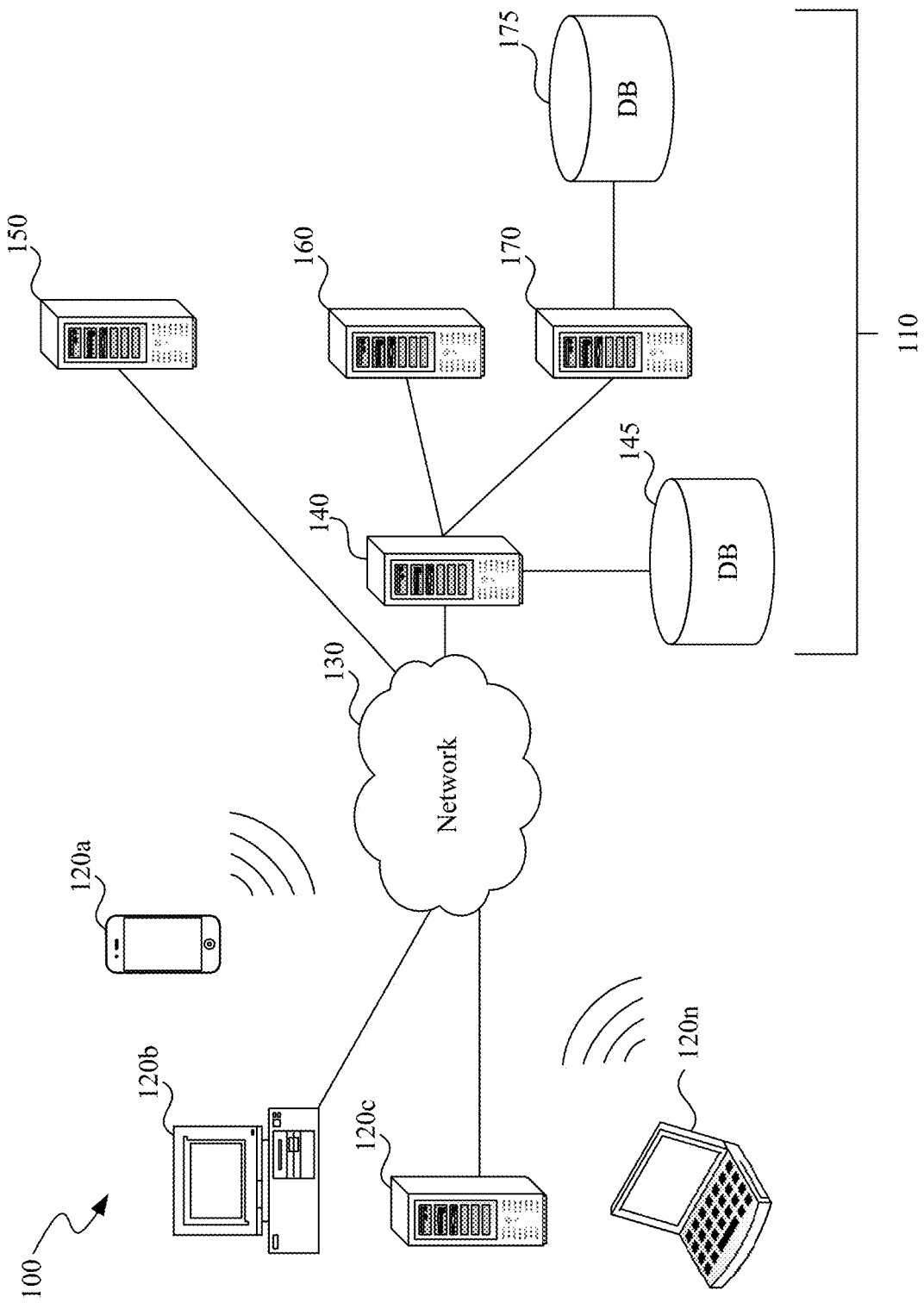
FIG. 1 shows an example system where user devices remotely access a corporate network system.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Employers are increasingly allowing their employees to access documents remotely which poses certain security risks. For example, a remote employee of a company may download sensitive personal information of the customers of the company. In another example, a remote employee's laptop, username, and password may be stolen and an unauthorized person may access a secure database to download or access sensitive personal information of the customers of the company.

This patent document describes example systems, methods, and apparatus that can prevent or deter a person from obtaining or accessing sensitive personal information about a person from a server. For example, a customer of a company or other user may control who can access his or her sensitive personal information by identifying his or her access preferences included in an access control list, where the access preference describes a level of access that at least one remote employee or person may have to the customer's sensitive personal information. A corporate data protection server may containerize the sensitive personal information and the access control list of the person in a data protection container. If a remote employee or a person requests access the customer's sensitive personal information, the corporate data protection server may provide the sensitive personal information to the remote employee or person by determining, using the access preference in the access control list, that the remote employee or person has access privilege to the customer's sensitive personal information and by determining that the remote employee or person's authentication information (e.g., username, password, biometric information) matches or is the same as an authorized authentication information stored on the corporate data protection server. Although references are made to a "corporate" server, "corporate" data protection server, and "corporate" network system, the techniques and systems described are applicable to servers and systems other than those of a company. Additionally, the techniques described are applicable to any sensitive information of any type of entity. For example, the sensitive information can be personal information of a person, classified documents of the government, or confidential documents of a company.

FIG. 1 shows an example system 100 where user devices 120a to 120n remotely access a corporate network system 110. A corporate network system 110 may include a corporate data protection server 140 used by the user devices to access the corporate network, one or more corporate servers 150, 160, 170, and one or more databases 145, 175. Data located on the one or more corporate servers 150, 160, and 170 or on the one or more databases 145, 175 can be accessed via the network 130, such as the Internet or Intranet. For example, the user devices 120a to 120n can remotely access a server and/or database(s) associated with the corporate network system 110 via the network 130. The user devices 120a to 120n may include computers such as a mobile device 120a, a desktop 120b, 120c, a laptop 120n, a wearable, or a tablet.

At least some user devices may be operated by employees or persons working remotely at locations outside of a corporate office or building, and at least some other user devices may be operated by customers of the company associated with the corporate network system 110. In this patent document, for ease of description, user device 120*b* may be operated by a customer and user device 120*n* may be operated by a remote employee who is requesting access to the customer's sensitive personal information. A customer's sensitive personal information may include his or her name, date of birth, credit card number, social security number, home address, bank account, health data, etc.

Figure 2:
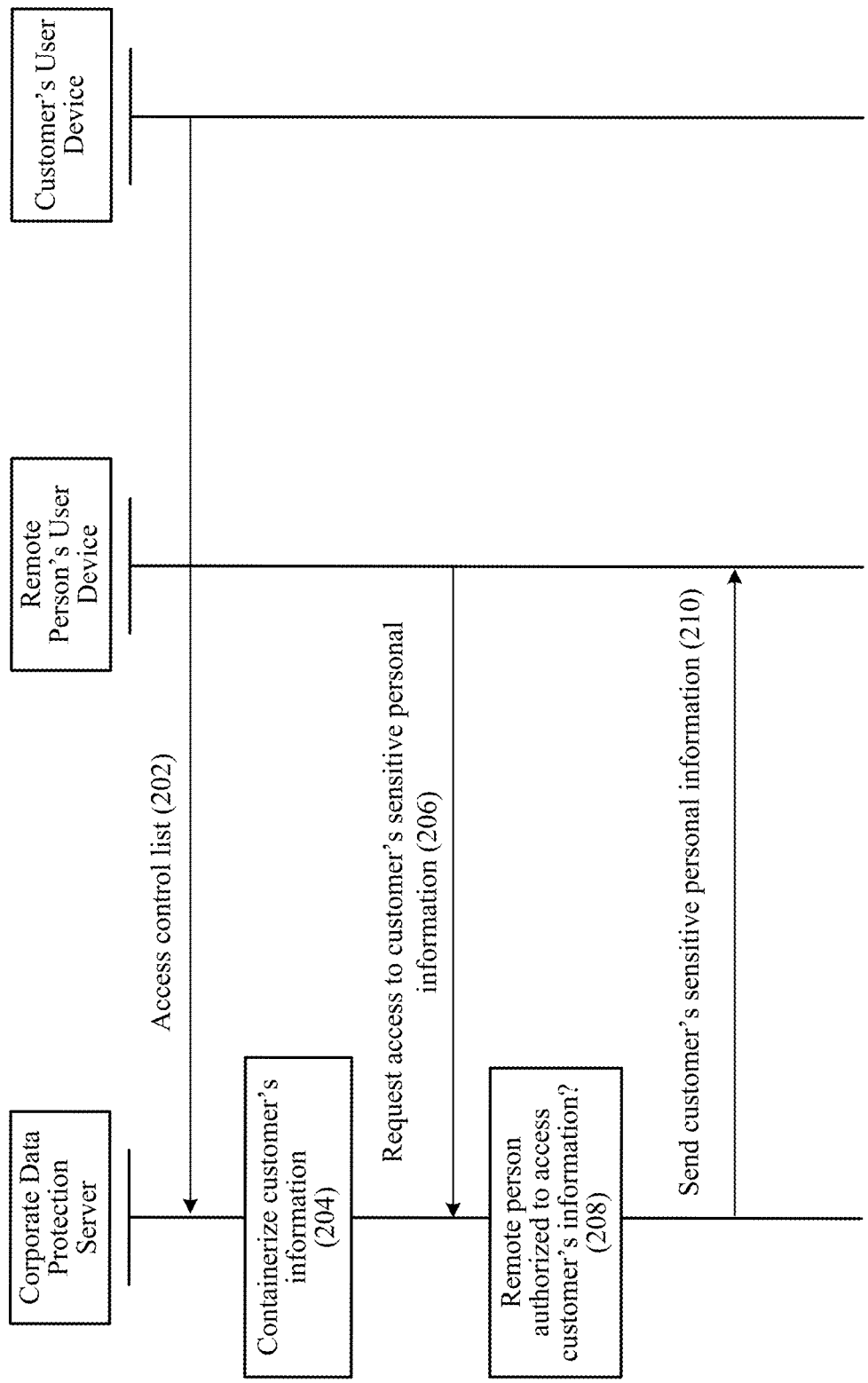
FIG. 2 shows a flow chart of operations performed by a corporate data protection server, user device operated by a customer, and a user device operate by a remote person.

FIG. 2 shows a flow chart of operations performed by the corporate data protection server 140, user device operated by a customer, and a user device operate by a remote person. A data protection scheme to protect sensitive personal information of a customer includes having the customer select access preferences included in the customer's access control list and send the access control list to the corporate data protection server 140 for storage (202). The access control list may be stored in a database in the data protection server or in a database in another server.

The access preferences describe levels of access that other persons (e.g., remote employees, third-party vendors) may have to the customer's sensitive personal information. For example, a customer may indicate via a graphical user interface displayed on the user device 120*b* that employees of a company may have full access to the customer's sensitive personal information and/or that third-party vendors may have partial access to certain sensitive personal information (e.g., name and/or date of birth). In another example, the customer may indicate via the GUI displayed on the user device 120 that the employees of the company may have a one-time access to the customer's sensitive information. In yet another example, the customer may indicate via the GUI displayed on the user device 120 that no person has access to the customer's sensitive information without the customer being first informed (e.g., via a text message or email) when another person requests access to the customer's sensitive personal information. The customer's user device can send to the corporate data protection server 140 a message that includes the access control list comprising the access preferences of the customer (202). In some implementations, the system automatically categorizes access levels based on the type of data and/or an identity of the accessing party, accessing device, or characteristics of the accessing party or accessing device (e.g., location).

The corporate data protection server 140 may include a containerization module (shown as 342 in FIG. 3) that containerizes the sensitive personal information and the access control list of the customer in a data protection container (204). Several conventional techniques exist to containerize data to provide a secure cloud computing environment. In an example implementation, the containerization module 342 may containerize sensitive information (e,g., sensitive personal information) and the access control list by adding metadata to the sensitive personal information where the metadata can indicate (1) the operation(s) that is/are allow or disallow on the remote person's user device when accessing the customer's sensitive personal information and (2) the level(s) of access by other person(s) or group(s) indicated in the access control list. For example, regarding (1) above, the metadata may indicate to the remote persons' user device that selecting a text associated with a credit card number or taking a snapshot of the display is not allowed.

Regarding (2) above, the content of the metadata used by the containerization module 342 can depend on the access preferences in the access control list selected by the customer. For example, if a customer's access preferences indicate that a third-party vendor may not receive the customer's sensitive information except name and date of birth, then the metadata can include information that indicates that third-party vendor's access rights are restricted, and that third-party vendor cannot view other sensitive personal information of the person. In this example, if a third-party vendor's computer accesses the corporate data protection server 140 with login information (e.g., username, Internet Protocol (IP) address) associated with the third-party vendor, the corporate data protection server 140 may only send the user's name and date of birth to the third-party vendor's computer.

In some embodiments, the corporate data protection server 140 may add to the customer's sensitive personal information a watermark of an identifier of the customer associated with the sensitive personal information. An identifier of the customer may include a unique customer number. A benefit of adding watermark of the customer's identifier is that if the sensitive personal information is stolen, the watermark can provide source identification so that appropriate authorities (e.g., Interpol or FBI) can identify the company from which the sensitive personal information was stolen.

At operation 206, a remote person's user device may send a message that includes a request to access the sensitive personal information of the customer and authentication information of the remote person that initiated the request. In some embodiments, authentication information may include login information such as username, password, public IP address of the remote person's user device and/or MAC address of the remote person's user device. In some embodiments, authentication information may include biometric information such as fingerprint information or voice of the remote person.

In some embodiments, operation 206 can be performed before operation 204 so that the containerization operation 204 may add to the customer's sensitive personal information a watermark of an identifier associated with the remote person. An identifier of the customer may include the remote person's name or login information or public IP address of the remote person's user device. A benefit of adding such a watermark is that it can be displayed on the remote person's user device after operation 210, which can act as a deterrent for the remote person to copy or take pictures of the sensitive personal information displayed on the remote person's user device.

At operation 208, the corporate data protection server 140's authorization module (shown as 344 in FIG. 3) can determine whether the remote person requesting access to the customer's sensitive personal information is authorized to do so. The authorization module 344 can perform operation 208 in two steps. The authorization module 344 can determine whether the authentication information provided by the remote person's user device matches or is the same as previously stored authorized authentication information. For example, if the username and password are the same as or match a previously stored username and password, then the authorization module 344 can determine that the remote person is authenticated.

The authorization module 344 can also determine whether the remote person is authorized by the customer to access the customer's sensitive personal information by using the customer's access control list. For example, based on the authentication information provided by the remote person's user device, the authorization module 344 may determine that (1) the remote person belongs to a group (e.g., employee of the company), (2) that the customer has indicated in the access control list that that group has full access to the customer's sensitive personal information, and thus, (3) that the remote person has full access to the customer's sensitive personal information.

At operation 208, if the authorization module 344 determines, using the access preference in the access control list, that the remote person has access privilege to the customer's sensitive personal information and if the authorization module 344 determines that the authentication information sent by the remote person's user device matches or is the same as a previously stored and authorized authentication information, then the authorization module 344 can send to the remote person's user device the customer's sensitive personal information to be displayed on the remote person's user device (210). The content of the sensitive personal information sent to the remote person's user device may be based on the access control list as processed by the containerization module 342 of the corporate data protection server 140 at the containerizing operation 204. In some embodiments, the authorization module 344 can perform the send operation 210 by sending an image comprising the sensitive personal information. Sending an image is a beneficial technical feature at least because it can further prevent a remote employee or other person from copying the text of the sensitive personal information.

In some embodiments, the remote person's user device may send a public IP address or a media access control (MAC) address of the remote person's user device at operation 206. In such embodiments, at operation 208, the authorization module 344 of the corporate data protection server 140 can compare the received IP address or MAC address to a list of approved devices, determine that the received IP address or MAC address is not found in the list, and determine that the public IP address or the MAC address associated with the remote person's user device is not approved to access the sensitive personal information of the person. Upon determining that the remote person's user device is not approved to access the sensitive personal information, the authorization module 344 can send a message to the containerization module 342 to delete the sensitive personal information from the data protection container.

In some embodiments, the remote person's user device may send a public IP address of the remote person's user device at operation 206. In such embodiments, at operation 208, the authorization module 344 of the corporate data protection server 140 can determine whether the public IP address is located within a previously approved geo-fenced area for the remote person's user device. If the authorization module 344 determines that the public IP address received at operation 206 is associated with a location that is outside of the previously approved geo-fenced area, then the authorization module 344 can send a message to the containerization module 342 to delete the sensitive personal information from the data protection container.

In some other embodiments, at operation 208 if the authorization module 344 determines that the received IP address or MAC address associated with the remote person's user device is not approved to access the sensitive personal information of the person, then the authorization module 344 can send a message to the containerization module 342 to obtain incorrect information (i.e., inaccurate or untrue information) about the customer. The authorization module 344 obtains the incorrect information from the containerization module 342 and sends the incorrect information about the customer instead of the correct sensitive personal information to protect the customer's data. In such embodiments, the containerization module 342 can obtain, from a pre-determined data set, a set of inaccurate personal information or a second set of personal information for the customer, where the inaccurate personal information is different from the sensitive personal information about the person. The pre-determined data set may include a random set of personal information. For example, the pre-determined data set may include multiple random names, multiple date of births, multiple home addresses, and multiple credit card numbers that do not exist. The containerization module 342 can randomly select the incorrect personal information from the pre-determined data set to send to the remote person's user device for display.

In some embodiments, at the containerization operation 204, the containerization module 342 may include pre-determined sensitive personal information about a fictional person in the data protection container that includes the sensitive personal information of the customer. The addition of the pre-determined sensitive personal information about the fictional person may enable the authorization module 344 of the corporate data protection server 140 (or another server) to determine whether that information has been leaked or hacked. For example, the corporate data protection server 140 may detect a presence of at least some of the pre-determined sensitive personal information in a data set provided to the corporate data protection server 140.

In some embodiments, the corporate data protection server 140 can communicate with a tracking device associated with sensitive information to track use of and/or access to the sensitive personal information that is sent to the remote person's user device. The tracking device may send a notice to the corporate data protection server 140 if an unauthorized person attempts to access the sensitive personal information of the customer. The containerization module 342 of the corporate data protection server 140 may change or delete the sensitive personal information of the customer if the authorization module 344 determines that an unauthorized person is attempting to access the sensitive personal information of the customer. In some embodiments, the tracking device is a software tool embedded in or associated with a document containing the sensitive personal information.

Figure 3:
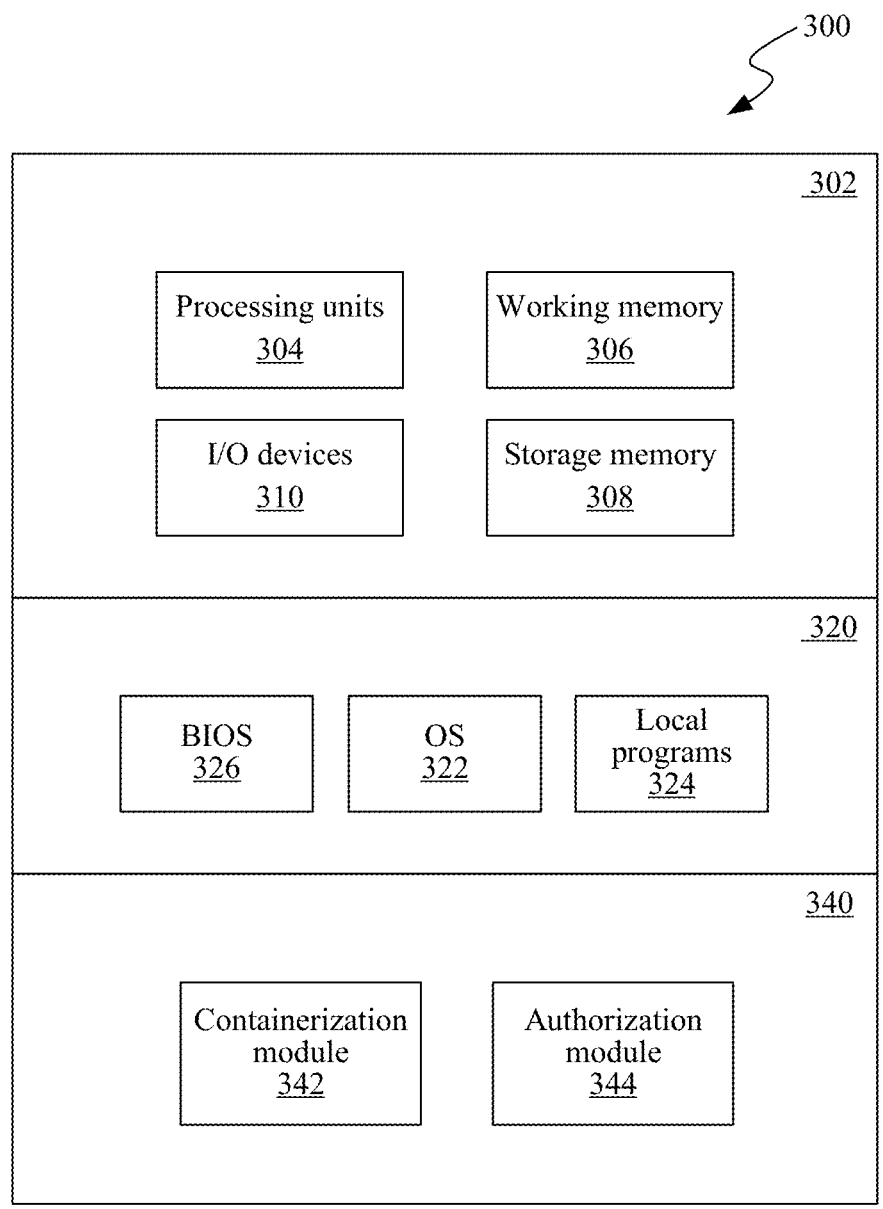
FIG. 3 is a block diagram illustrating an overview of devices on which some implementations of the disclosed technology can operate.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware, including processing units 304 (e.g., CPUs, GPUs, APUs, etc.), working memory 306, storage memory 308, and input and output devices 310. Some or all of the components 300 can be implemented on a corporate data protection server (e.g., 140 in FIG. 1). For example, a memory may store instructions that upon execution by the processing units 304 configure the corporate data protection server 140 to perform the operations described in FIGS. 2 and 4 and/or in the various embodiments described in this patent document.

General software 320 can include various applications, including an operating system 322, local programs 324, and a basic input output system (BIOS) 326. Specialized components 340 can be subcomponents of a general software application 320, such as local programs 324. Specialized components 340 can include any one or more of a containerization module 342 and an authorization module 344 as described in this patent document.

Figure 4:
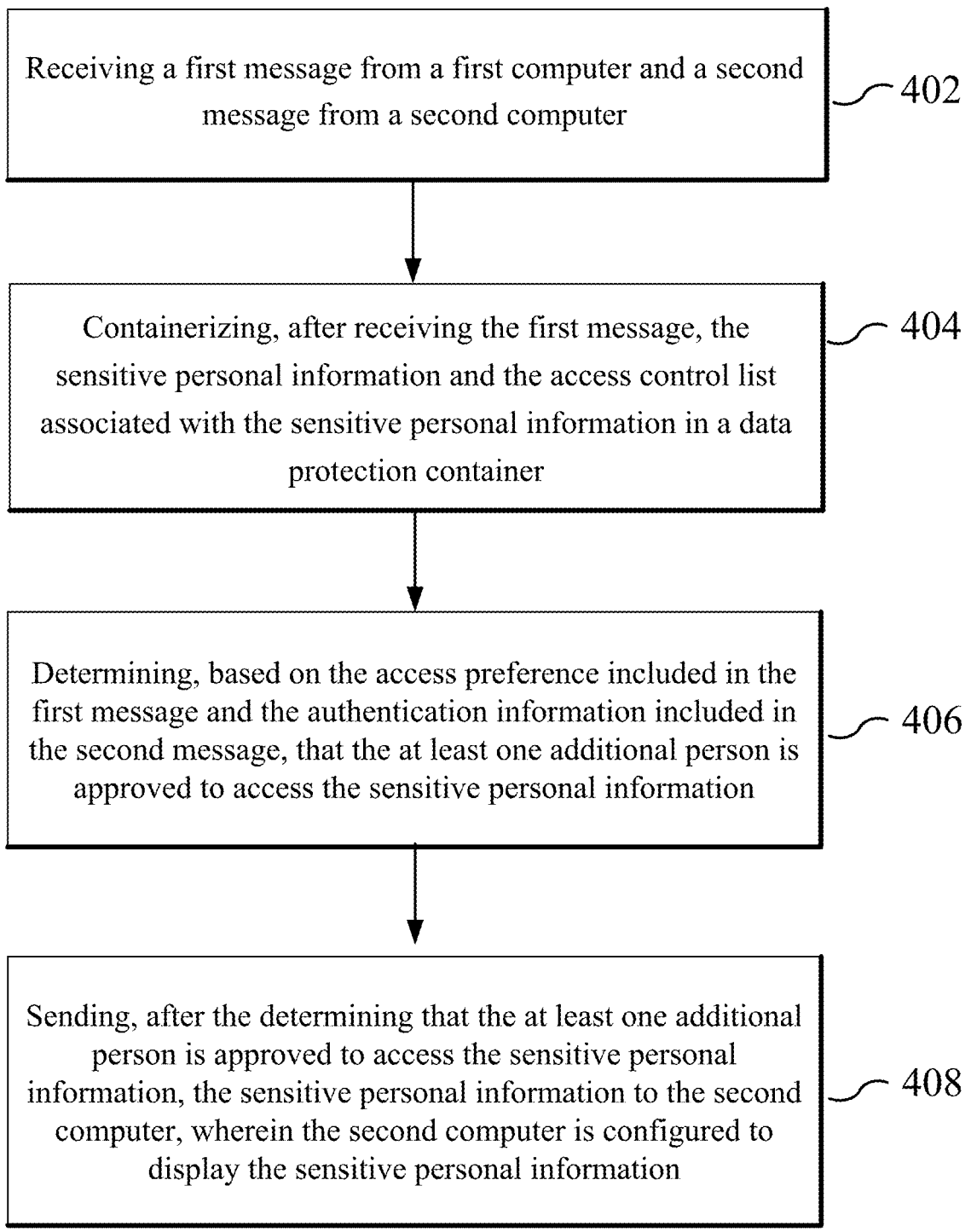
FIG. 4 shows an exemplary flow diagram performed by a corporate data protection server to protect sensitive personal information.

FIG. 4 shows an exemplary flow diagram performed by a corporate data protection server 140 to protect sensitive personal information. At the receiving operation 402, the containerization module 342 receives a first message from a first computer and a second message from a second computer. The first message includes an access control list that includes an access preference, the access preference describes a level of access to sensitive personal information about a person by at least one additional person, and the second message comprises a request to access the sensitive personal information and authentication information of the at least one additional person that initiated the request. In some embodiments, the access preference indicates that the level of access is a one-time access where the at least one additional person is allowed to access the sensitive personal information once.

At the containerizing operation 404, the containerization module 342 containerizes, after receiving the first message, the sensitive personal information and the access control list associated with the sensitive personal information in a data protection container. In some embodiments, the sensitive personal information is containerized by including a watermark of an identifier of the at least one person that initiated the request to access the sensitive personal information, and the watermark is sent to the second computer to be displayed with the sensitive personal information. In some embodiments, the sensitive personal information is containerized by including a watermark of an identifier of the person associated with the sensitive personal information, and the watermark is sent to the second computer to be displayed with the sensitive personal information.

At the determining operation 406, the authorization module 344 determines, based on the access preference included in the first message and the authentication information included in the second message, that the at least one additional person is approved to access the sensitive personal information. At the sending operation 408, the authorization module 344 sends, after the determining that the at least one additional person is approved to access the sensitive personal information, the sensitive personal information to the second computer, wherein the second computer is configured to display the sensitive personal information.

In some embodiments, the second message includes a public Internet Protocol (IP) address or a media access control (MAC) address associated with the second computer, so that the authorization module 344 determines that the public IP address or the MAC address associated with the second computer is not approved to access the sensitive personal information of the person, and the containerization module 342 deletes the sensitive personal information from the data protection container upon determining that the second computer is not approved to access the sensitive personal information. In some embodiments, the second message includes a public Internet Protocol (IP) address associated with the second computer so that the authorization module 344 determines that the public IP address associated with the second computer is associated with a location that is outside of a previously approved geo-fenced area for the second computer, and the containerization module 342 deletes the sensitive personal information from the data protection container upon determining that the second computer is located outside of the previously approved geo-fenced area.

In some embodiments, the second message includes a public Internet Protocol (IP) address or a media access control (MAC) address associated with the second computer, the authorization module 344 determines that the public IP address or the MAC address associated with the second computer is not approved to access the sensitive personal information of the person, the containerization module 342 obtaining, from a pre-determined data set, a set of inaccurate personal information for the person upon determining that the second computer is not approved to access the sensitive personal information, where the inaccurate personal information is different from the sensitive personal information about the person, and the authorization module 344 sends the inaccurate personal information about the person to the second computer.

In some embodiments, the sensitive personal information is containerized by including a pre-determined sensitive personal information about a fictional person, and the authorization module 344 determines that the pre-determined sensitive personal information about the fictional person is leaked by detecting a presence of at least some of the pre-determined sensitive personal information in a data set.

In some embodiments, a non-transitory computer-readable medium comprising computer-readable instructions for providing data protection is described. The computer-readable instructions comprising instructions that when executed by a processor causes the processor to implement a method described in FIGS. 2 and 4, in the various embodiments in this patent document, and/or operations of the modules described in this patent document.

Those skilled in the art will appreciate that the components illustrated in FIGS. 2 and 4 described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A data protection system, comprising:
a first computer comprising a processor configured to:
receive, via a graphical user interface, an access preference included in an access control list, wherein the access preference describes a level of access, provided by a customer of an enterprise, to sensitive personal information about the customer by at least one additional person associated with the enterprise, wherein the first computer is associated with the customer, and
wherein the access preference includes a type of user associated with the enterprise permitted to access the sensitive personal information;
send, to a server, a first message comprising the access control list that includes the access preference;
a second computer comprising a processor configured to:
send, to the server, a second message comprising a request to access the sensitive personal information and authentication information of the at least one additional person that initiated the request;
the server comprising a processor configured to:
receive the first message from the first computer and the second message from the second computer;
containerize, after receiving the first message, the sensitive personal information and the access control list associated with the sensitive personal information in a data protection container;
determine, based on the access preference included in the first message and the authentication information included in the second message, that the at least one additional person is not the type of user associated with the enterprise permitted to access the sensitive personal information;
in response to determining that the at least one additional person is not permitted to access the sensitive personal information, obtain, from a pre-determined data set, a set of inaccurate personal information for the customer, wherein the set of inaccurate personal information is different from the sensitive personal information about the customer; and
send the set of inaccurate personal information to the second computer associated with the at least one additional person, wherein the second computer is configured to display the set of inaccurate personal information.

2. The system of claim 1,
wherein the sensitive personal information is containerized by including a watermark of an identifier of the at least one additional person that initiated the request to access the sensitive personal information, and
in response to determining that the second computer is approved to access the sensitive personal information, send the watermark to the second computer to be displayed with the sensitive personal information.

3. The system of claim 1,
wherein the sensitive personal information is containerized by including a watermark of an identifier of the customer associated with the sensitive personal information, and
in response to determining that the second computer is approved to access the sensitive personal information, send the watermark to the second computer to be displayed with the sensitive personal information.

4. The system of claim 1, wherein the access preference indicates that the level of access is a one-time access where the at least one additional person is allowed to access the sensitive personal information once.

5. The system of claim 1,
wherein the second message includes a public Internet Protocol (IP) address or a media access control (MAC) address associated with the second computer, and
wherein the server comprising the processor is further configured to:
  determine that the public IP address or the MAC address associated with the second computer is not approved to access the sensitive personal information of the customer; and
  delete the sensitive personal information from the data protection container upon determining that the second computer is not approved to access the sensitive personal information.

6. The system of claim 1,
wherein the second message includes a public Internet Protocol (IP) address associated with the second computer, and
wherein the server comprising the processor is further configured to:
  determine that the public IP address associated with the second computer is associated with a location that is outside of a previously approved geo-fenced area for the second computer; and
  delete the sensitive personal information from the data protection container upon determining that the second computer is located outside of the previously approved geo-fenced area.

7. The system of claim 1,
wherein the second message includes a public Internet Protocol (IP) address or a media access control (MAC) address associated with the second computer, and
wherein the server comprising the processor is further configured to:
  determine that the public IP address or the MAC address associated with the second computer is not approved to access the sensitive personal information of the customer;
  obtain, from a pre-determined data set, a set of inaccurate personal information for the customer upon determining that the second computer is not approved to access the sensitive personal information, wherein the inaccurate personal information is different from the sensitive personal information about the customer; and
  send the inaccurate personal information about the customer to the second computer.

8. The system of claim 1,
wherein the sensitive personal information is containerized by including a pre-determined sensitive personal information about a fictional person, and
wherein the server comprising the processor is further configured to:
determine that the pre-determined sensitive personal information about the fictional person is leaked by detecting a presence of at least some of the pre-determined sensitive personal information in a data set.

9. A data protection method, comprising:
receiving a first message from a first computer and a second message from a second computer,
  wherein the first message includes an access control list that includes an access preference,
  wherein the access preference describes a level of access, provided by a customer of an enterprise, to sensitive personal information about the customer by at least one additional person associated with the enterprise,
  wherein the first computer is associated with the customer, and
  wherein the access preference includes a type of user associated with the enterprise permitted to access the sensitive personal information, and
  wherein the second message comprises a request to access the sensitive personal information and authentication information of the at least one additional person that initiated the request;
containerizing, after receiving the first message, the sensitive personal information and the access control list associated with the sensitive personal information in a data protection container;
determining, based on the access preference included in the first message and the authentication information included in the second message, that the at least one additional person is not the type of user associated with the enterprise permitted to access the sensitive personal information;
in response to determining that the at least one additional person is not permitted to access the sensitive personal information, obtain, from a pre-determined data set, a set of inaccurate personal information for the customer, wherein the set of inaccurate personal information is different from the sensitive personal information about the customer; and
sending the set of inaccurate personal information to the second computer associated with the at least one additional person, wherein the second computer is configured to display the set of inaccurate personal information.

10. The method of claim 9,
wherein the sensitive personal information is containerized by including a watermark of an identifier of the at least one additional person that initiated the request to access the sensitive personal information, and
in response to determining that the second computer is approved to access the sensitive personal information, sending the watermark to the second computer to be displayed with the sensitive personal information.

11. The method of claim 9,
wherein the sensitive personal information is containerized by including a watermark of an identifier of the customer associated with the sensitive personal information, and in response to determining that the second computer is approved to access the sensitive personal information, sending the watermark to the second computer to be displayed with the sensitive personal information.

12. The method of claim 9, wherein the access preference indicates that the level of access is a one-time access where the at least one additional person is allowed to access the sensitive personal information once.

13. The method of claim 9,
wherein the second message includes a public Internet Protocol (IP) address or a media access control (MAC) address associated with the second computer, and
wherein the method further comprises:
   determining that the public IP address or the MAC address associated with the second computer is not approved to access the sensitive personal information of the customer; and
   deleting the sensitive personal information from the data protection container upon determining that the second computer is not approved to access the sensitive personal information.

14. The method of claim 9,
wherein the second message includes a public Internet Protocol (IP) address associated with the second computer, and
wherein the method further comprises:
   determining that the public IP address associated with the second computer is associated with a location that is outside of a previously approved geo-fenced area for the second computer; and
   deleting the sensitive personal information from the data protection container upon determining that the second computer is located outside of the previously approved geo-fenced area.

15. The method of claim 9,
wherein the second message includes a public Internet Protocol (IP) address or a media access control (MAC) address associated with the second computer, and
wherein the method further comprises:
   determining that the public IP address or the MAC address associated with the second computer is not approved to access the sensitive personal information of the customer;
   obtaining, from a pre-determined data set, a set of inaccurate personal information for the customer upon determining that the second computer is not approved to access the sensitive personal information, wherein the inaccurate personal information is different from the sensitive personal information about the customer; and
   sending the inaccurate personal information about the customer to the second computer.

16. The method of claim 9,
wherein the sensitive personal information is containerized by including a pre-determined sensitive personal information about a fictional person, and
wherein the method further comprises:
   determining that the pre-determined sensitive personal information about the fictional person is leaked by detecting a presence of at least some of the pre-determined sensitive personal information in a data set.

17. A non-transitory computer-readable medium comprising computer-readable instructions for providing data protection, said computer-readable instructions comprising instructions that when executed by a processor causes the processor to implement a method comprising:
   receiving a first message from a first computer and a second message from a second computer,
      wherein the first message includes an access control list that includes an access preference,
      wherein the access preference describes a level of access, provided by a customer to an enterprise, to sensitive personal information about the customer by at least one additional person associated with the enterprise,
      wherein the first computer is associated with the customer, and
      wherein the access preference includes a type of user associated with the enterprise permitted to access the sensitive personal information, and
      wherein the second message comprises a request to access the sensitive personal information and authentication information of the at least one additional person that initiated the request;
   containerizing, after receiving the first message, the sensitive personal information and the access control list associated with the sensitive personal information in a data protection container;
   determining, based on the access preference included in the first message and the authentication information included in the second message, that the at least one additional person is not the type of user associated with the enterprise permitted to access the sensitive personal information;
   in response to determining that the at least one additional person is not permitted to access the sensitive personal information, obtain, from a pre-determined data set, a set of inaccurate personal information for the customer, wherein the set of inaccurate personal information is different from the sensitive personal information about the customer; and
   sending the set of inaccurate personal information to the second computer associated with the at least one additional person, wherein the second computer is configured to display the set of inaccurate personal information.

18. The non-transitory computer-readable medium of claim 17,
wherein the sensitive personal information is containerized by including a watermark of an identifier of the at least one additional person that initiated the request to access the sensitive personal information, and
in response to determining that the second computer is approved to access the sensitive personal information, sending the watermark to the second computer to be displayed with the sensitive personal information.

19. The non-transitory computer-readable medium of claim 17,
wherein the sensitive personal information is containerized by including a watermark of an identifier of the customer associated with the sensitive personal information, and
in response to determining that the second computer is approved to access the sensitive personal information, sending the watermark to the second computer to be displayed with the sensitive personal information.

20. The non-transitory computer-readable medium of claim 17, wherein the access preference indicates that the level of access is a one-time access where the at least one additional person is allowed to access the sensitive personal information once.

* * * * *